Aug. 21, 1962  J. J. HORGAN  3,049,875
VARIABLE FLAP PLUG TYPE NOZZLE
Filed May 5, 1959  3 Sheets-Sheet 1

INVENTOR
JOHN J. HORGAN
BY Vernon F. Hauschild
ATTORNEY

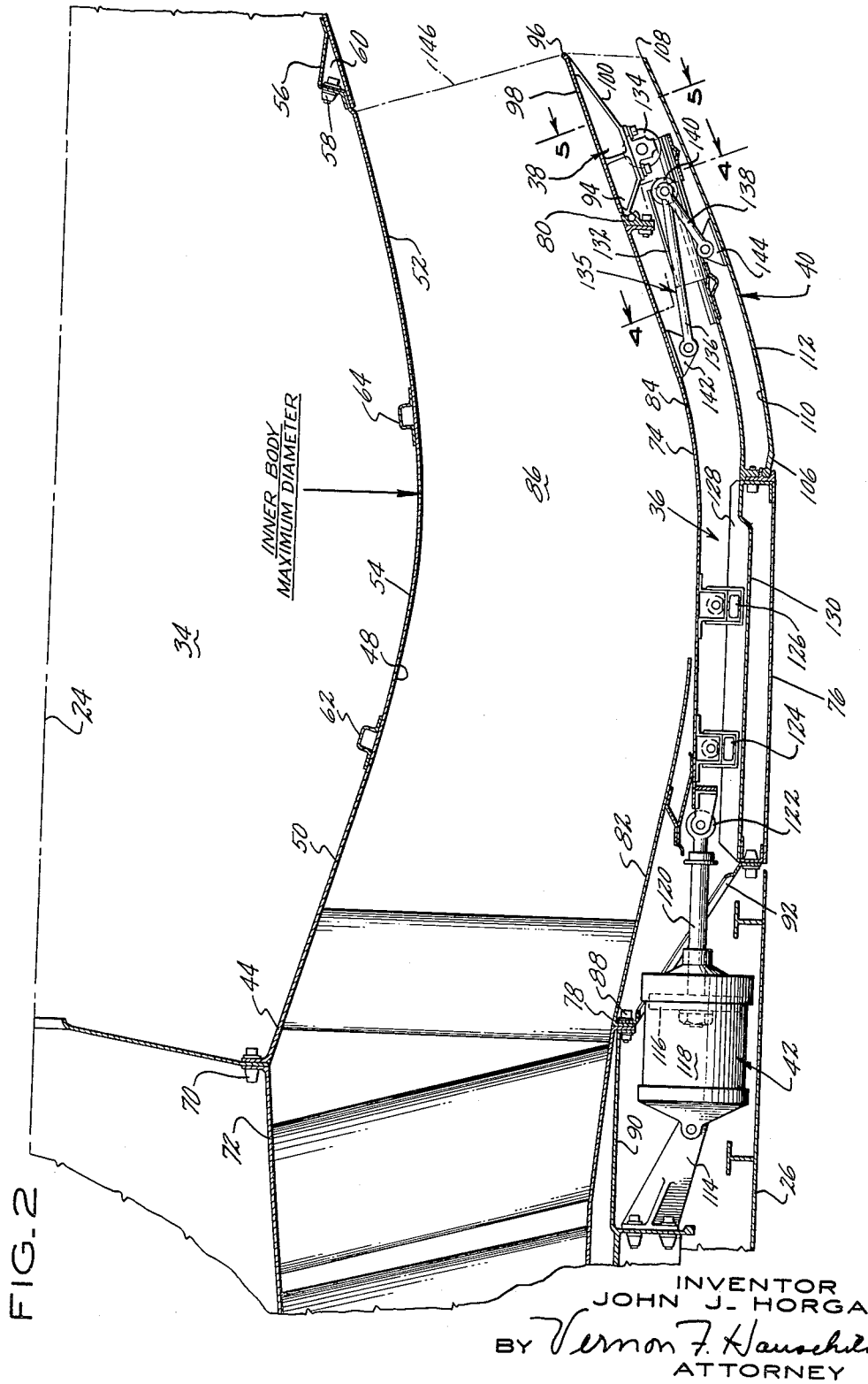

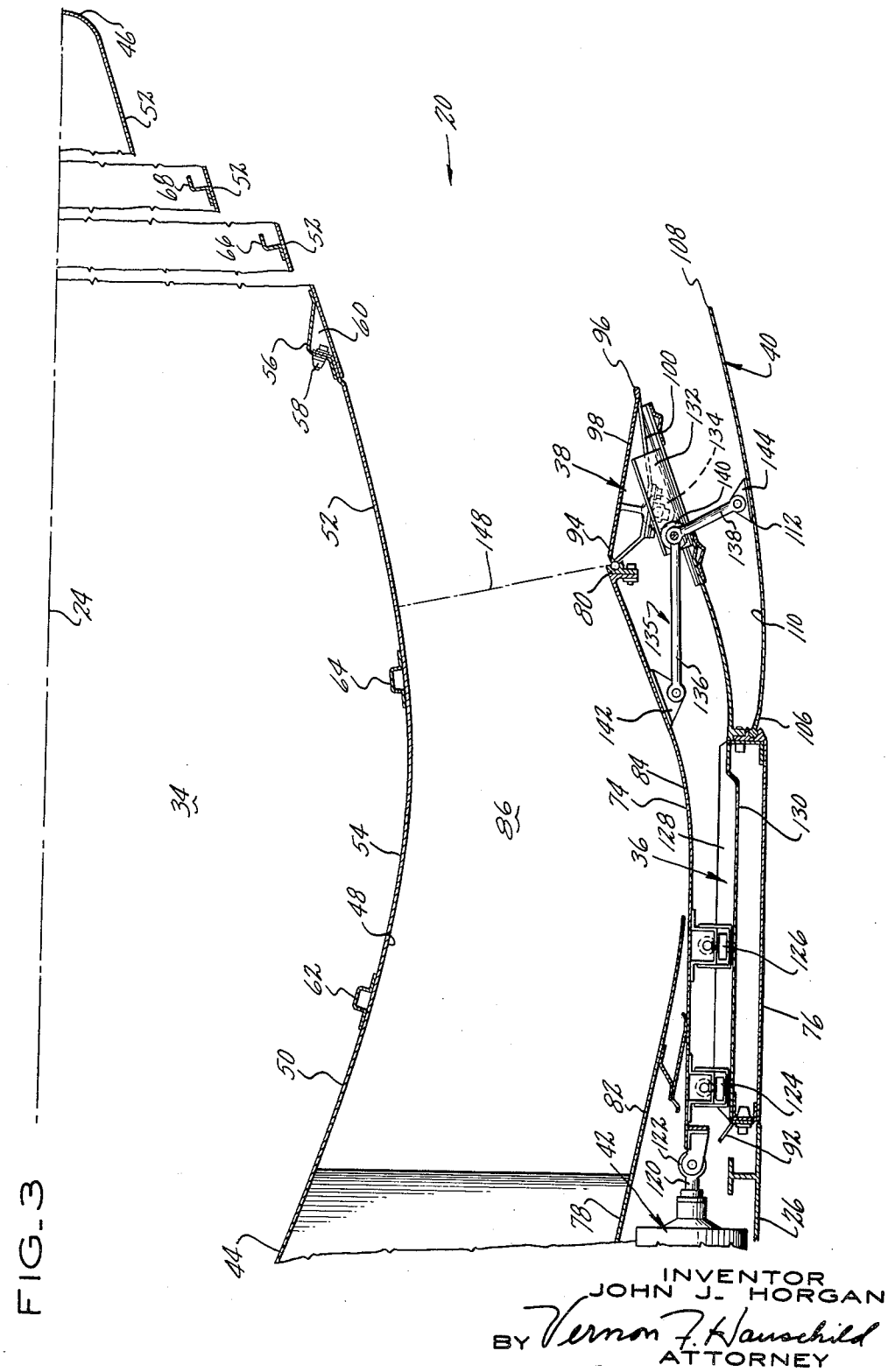

United States Patent Office 3,049,875
Patented Aug. 21, 1962

3,049,875
VARIABLE FLAP PLUG TYPE NOZZLE
John J. Horgan, Tariffville, Conn., assignor to United Aircraft Corporation, East Hartford, Conn., a corporation of Delaware
Filed May 5, 1959, Ser. No. 811,219
7 Claims. (Cl. 60—35.6)

This invention relates to aircraft engines of the jet propulsion type and more particularly to the exhaust nozzles used therewith.

It is an object of this invention to teach an exhaust nozzle which has good thrust generating characteristics at both subsonic and supersonic flight speeds and which creates minimum base drag.

It is a further object of this invention to teach a thrust nozzle which provides convergent nozzle performance for subsonic flight conditions and convergent-divergent performance for supersonic flight conditions.

It is a further object of this invention to teach a thrust nozzle in which one or more flap pluralities are actuatable by a reciprocal gas passage defining duct.

It is a further object of this invention to teach a thrust nozzle of the type described which utilizes a fixed plug concentrically surrounded by one or more of a plurality of pivotable flaps.

The two positions referred to as subsonic and supersonic are only general terms. In each position the nozzle is capable of good performance in both regions and transonically. Each does, however, obtain its optimum performance as described below.

Other objects and advantages will be apparent from the specification and claims and from the accompanying drawings which illustrate an embodiment of the invention.

FIG. 2 is a partial cross-sectional showing of my exhaust nozzle in the low speed or subsonic position.

FIG. 3 corresponds to FIG. 2 but with my exhaust nozzle shown in its high speed or supersonic position.

Figure 4:
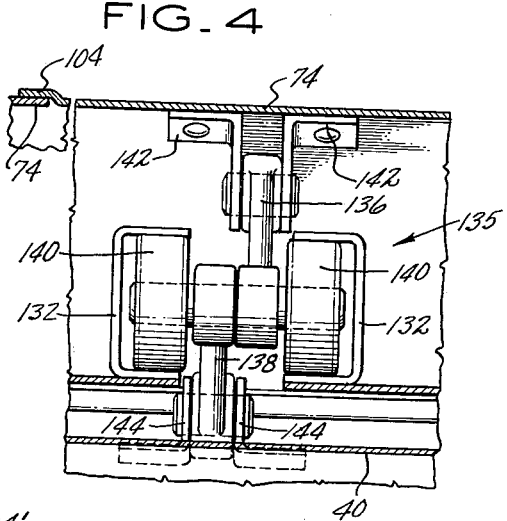

FIG. 4 is a partial showing taken along line 4—4 of FIG. 2.

Figure 5:
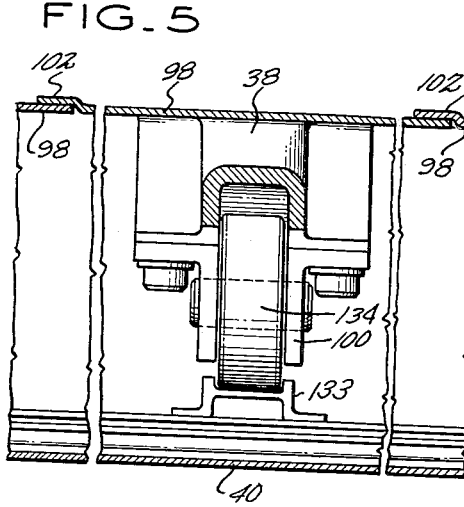

FIG. 5 is a partial showing taken along line 5—5 of FIG. 2.

Figure 6:
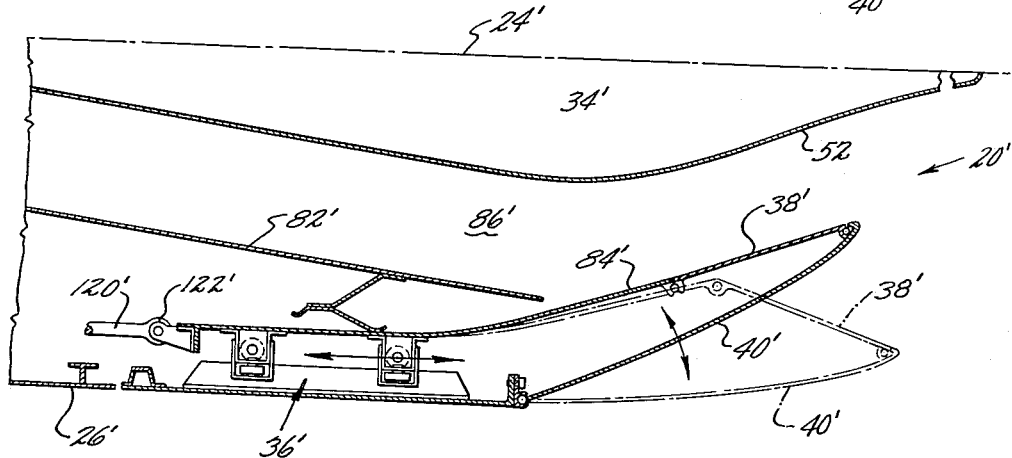

FIG. 6 shows my exhaust nozzle utilizing a single flap plurality as opposed to two separate flap pluralities as shown in FIGS. 2 and 3.

Figure 1:
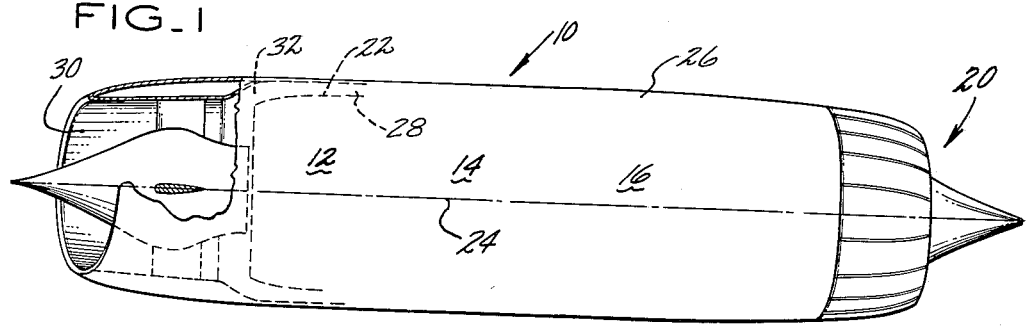
FIG. 1 is an external view of an aircraft engine of the jet propulsion type using my thrust nozzle.

FIG. 1 shows aircraft engine 10 which comprises compressor section 12, burner section 14, turbine section 16 and variable area exhaust nozzle 20. Compressor 12, burner 14 and turbine 16 are enveloped within engine case 22 and aligned along axis 24. Nacelle, pod or fairing 26 may be used to envelop engine case 22. Air enters engine inlet 30, is compressed in passing through compressor 12, is heated in passing through burner section 14, has energy extracted therefrom to drive compressor 12 while passing through turbine section 16 and is then discharged to atmosphere to generate thrust by passing through exhaust nozzle 20. It will be obvious to those skilled in the art that an afterburner of the type taught in U.S. Patent No. 2,863,282 may well be inserted between turbine 16 and exhaust nozzle 20. Cooling air may enter annular inlet 32 or be bled from compressor 12 to annular cooling passage 28 defined between nacelle 26 and engine case 22 to be guided over the surfaces of exhaust nozzle 20. Engine 10, including exhaust nozzle 20, and nacelle 26 are preferably of generally circular cross section and concentric about axis 24, but the nozzle 20 could also be of generally rectangular cross section without deviating from the spirit of this invention. Exhaust nozzle 20 is shown in greater particularity in FIGS. 2 and 3 to which reference will now be made.

Exhaust nozzle 20 comprises inner body 34, outer member 36 and inner flap plurality 38 and an outer flap plurality 40, all of which are of generally circular cross section and concentric about axis 24, together with actuating means 42. It will be obvious to those skilled in the art that while a plural flap plurality is shown, a single flap plurality (FIG. 6) having inner and outer surfaces may be substituted therefor without departing from the spirit of the invention taught herein. Inner body 34 has a forward end 44 and an after end 46 and is preferably made of lightweight sheet metal having an outer surface 48 defined by wall 50 at its forward end which is divergent with respect to axis 24 and wall 52 at its after end which is convergent with respect to axis 24 and central wall 54 which smoothly joins divergent wall 50 and convergent wall 52 and defines the region of maximum diameter of inner body 34 (see FIG. 2). While not necessarily so limited, inner body 34 may be made in two pieces joined along connecting flange 56 to be separable by releasing connecting means 58 through access holes 60 and, further, it may be found advisable to provide strengthening ribs 62, 64, 66 and 68 for inner body 34. Inner body 34 is shown to be supported by connecting means 70 to inner support duct 72 of turbine 16.

Outer member 36 comprises inner wall 74 and substantially cylindrical outer wall 76, both of which concentrically envelop a portion of inner body 34 so that the forward end 78 of outer member 36 is substantially in radial alignment with the forward end 44 of inner body 34 while the after end 80 of member 36 is spaced a substantial distance axially upstream of the after end 46 of inner body 34. Inner wall 74 comprises fixed portion 82 which is divergent with respect to axis 24 and movable portion 84 which is convergent with respect to axis 24 to a greater degree than is convergent wall 52 of inner body 34 so that the annular gas passage 86 which is formed between inner body 34 and outer member 36 is of annular cross section and is divergent with respect to axis 24 at its forward end and then convergent with respect to axis 24 at its after end while converging gradually in cross-sectional area from its forward to after end. Inner wall 74 is supported by connecting means 88 from turbine outer duct 90 while outer wall 76 is supported therefrom by a plurality of circumferentially positioned brackets 92.

Inner flaps 38 are circumferentially positioned about and pivotally attached to the after end 80 of outer member inner wall 74 and are made in overlapping sealing relation through seal strip 102, as best shown in FIG. 5, so as to constitute a variable area continuation thereof. Flaps 38 comprise forward end 94, after end 96, inner surface 98 and outer surface 100.

Outer flaps 40 are positioned circumferentially about outer wall 76 of outer member 36 and pivotally attached thereto in overlapping sealing engagement in the same fashion as illustrated for inner flap 38 in FIG. 5 to constitute a variable area continuation thereof. Outer flaps 40 have forward ends 106, after ends 108, inner surface 110 and outer surface 112.

Actuating means 42 is supported from turbine outer case 90 by brackets 114 and comprises hydraulically actuated piston 116 positioned within hydraulic cylinder 118 with actuating rod 120 extending therefrom to engage movable convergent portion 84 of inner wall 74 at connecting means 122 so that reciprocation of piston 116 within cylinder 118 will cause convergent portion 84 to reciprocate axially therewith. Hydraulic fluid may be provided to one side of piston 116 while being bled from the opposite side thereof in conventional fashion to bring about this actuation. Converging portion 84 is guidably suppported by roller members 124 and 126 which are guided in their axial travel by track 128 which is supported from and positioned by support shroud 130, which in turn is concentrically supported between inner wall 74 and outer wall 76 of outer member 36 by support brackets 92. Any number of actuating units 42 and bearing track units 24—28 may be positioned circumferentially about converging member 84 to insure smooth and positive position actuating thereof. Actuating means 42 is used to cause convergent portion 84 to reciprocate between its FIG. 2 subsonic position and its FIG. 3 supersonic position.

Support shroud 130 further supports track units 132 between inner flaps 38 and outer flaps 40. Inner flaps 38 are connected to track unit 133 (FIG. 5) by roller 134 while connecting means 135, which includes links 136 and 138 which are each pivotally connected at one of their ends to track unit 132 by roller 140 (FIG. 4) while the opposite ends of links 136 and 138 are pivotally attached to convergent portion 84 by bracket 142 and outer flap 40 by bracket 144, respectively.

Due to the coaction of actuating means 42 and connecting means 135, flaps 38 and 40 may be made to pivot between their subsonic FIG. 2 position and their supersonic FIG. 3 position in a manner now to be described. As shown in FIG. 2, piston 116 has caused convergent portion 84 of inner wall 74 of outer member 36 to move axially to its far right, after or downstream position in which track unit 133, acting through rollers 134 has caused inner flaps 38 to pivot to their inner positon. In this inner flap inner position, the inner surfaces 98 of flaps 38 form a convergent continuation of convergent member 84 and further define a convergent continuation of convergent gas passage 86 to define an exhaust nozzle throat 146 between the after end 96 of inner flaps 86 and the convergent wall 52 of inner body 34 and which is substantially perpendicular to wall 52 and constitutes the minimum area passage in convergent gas passage 86. The rearward movement of convergent portion 84 coacting with connecting means 135 and track unit 132 has caused outer flaps 40 to pivot at their forward ends 106 about outer wall 76 of outer member 36 into their FIG. 2 position wherein they form a smooth convergent continuation of outer wall 76 and wherein outer surface 112 thereof at its after end 108 is substantially parallel to inner surface 98 of inner flap 38.

With exhaust nozzle 20 in its FIG. 2 subsonic position, the exhaust gases from engine 10 are passed in a heated and pressurized condition through convergent gas passage 86 to be discharged therefrom through tipped throat 146 at a velocity which will cause them to pass along the surface of convergent wall 52 of inner body 34. Free stream air will pass along the surface of outer wall 76 which is a continuation of the nacelle 26 in a direction to cause the engine exhaust gases to initially flow against convergent wall 52 of inner body 34. The purpose of causing inner body 34 to extend substantially axially beyond outer member 36 so that a substantial portion of converging wall 52 is exposed therebeyond is to provide an elongated surface against which the engine exhaust gases may bear during the subsonic flight condition and thereby generate maximum thrust. The purpose for contouring outer surface 112 of outer flap 40 in the fashion described is to insure that no low pressure pockets are formed therealong or at the connection between outer wall 76 and flap 40, thereby creating drag, and to further provide a stream of air flowing in a direction which will tend to prevent separation of engine exhaust gases from convergent wall 52 while the exhaust gases are above atmospheric pressure and then to promote such separation by means of a shock system and thereby prevent overexpansion of the propulsive fluid to less than the free stream static pressure.

As hydraulic fluid causes piston 116 to move leftwardly or forward, convergent portion 84 moves from its FIG. 2 to its FIG. 3 position and coacts with connecting means 135 and track unit 132 to cause flaps 38 and 40 to pivot to their outer FIG. 3 position thereby forming a convergent-divergent supersonic exhaust nozzle. With exhaust nozzle 20 in its FIG. 3 position, a tipped throat 148 is formed between the after end 80 of convergent portion 84 and the divergent wall 52 of inner body 34, which throat 148 is substantially perpendicular to wall 52 and constitutes the minimum cross-sectional area point in convergent gas passage 86. As used herein, the term "tipped throat" means a throat which extends in a direction which is not perpendicular to axis 24 and hence is "tipped" with respect thereto. When in the FIG. 3 position, the inner surfaces 98 of inner flaps 38 form a smooth divergent continuation of convergent portion 84 while the outer surfaces 112 of outer flaps 40 coact with outer wall 76 and nacelle 26 to define a substantially cylindrical shape having no recessed pockets therein that free stream air passing thereover may create low pressure, drag creating pockets. With exhaust nozzle 20 in its FIG. 3 position, the exhaust gases from engine 10 pass through convergent gas passage 86 and tipped throat 148 thereof and expand jointly along the convergent wall 52 of inner body 34 and the divergent surface formed by the inner surface 98 of flaps 38, thereby generating thrust. It should be noted that tipped throat 148 is equal to or of greater cross-sectional area than and spaced axially forward of tipped throat 146.

From the above it will be apparent that the construction just described provides a low speed or subsonic exhaust nozzle with substantially convergent nozzle performance. The exhaust gases discharged through the tipped throat expand along the thrust generating surface with means to cause the exhaust gases to follow this thrust generating surface due to the proper directional flow of a second fluid stream external thereof until the gases separate from the thrust generating surface at essentially free stream static pressure. This construction also provides a supersonic convergent-divergent exhaust nozzle having a tipped throat of larger cross-sectional area than the throat of the subsonic nozzle with provision for substantial convergent and divergent portions or walls for the engine exhaust gases discharged through the throat thereof to act upon, thereby efficiently generating thrust. Further, due to the contouring of outer wall 76 and outer flaps 40, minimum base drag is created when exhaust nozzle 20 is in either its subsonic FIG. 2 position or supersonic FIG. 3 position. This base drag may be further reduced by allowing cooling air from the annular duct 32 or compressor 12 to flow along the passage 28 through passages formed between surfaces 82, 84, 130 and exiting in the annular passage between 96 and 108.

FIG. 6 shows a single flap construction of my exhaust nozzle which will operate precisely as described for the plural flap configuration. Primed reference numerals are used therein corresponding to the reference numerals used in FIGS. 1–5.

It is to be understood that the invention is not limited to the specific embodiment herein illustrated and described but may be used in other ways without departure from its spirit as defined by the following claims.

I claim:
1. An exhaust nozzle having an axis and adapted to be used on a jet propulsion type aircraft engine which will fly at both subsonic and supersonic speeds comprising a fixed inner body having a forward and an after end and further having a diverging wall at its forward end and a converging wall at its after end with a central wall smoothly joining said diverging and converging walls to define the region of maximum dimension of said inner body, an outer duct having a forward and an after end and an inner and outer surface and concentrically enveloping a part of said inner body and extending from the forward end thereof and terminating substantially short of the after end thereof at a point aft of said inner body maximum dimension region and being divergent at said forward end and convergent at said after end to a greater degree than said inner body converging wall to define a gas passage with said inner body which is divergent with respect to said axis at its forward end and which is convergent with respect to said axis at its after end, a plurality of flaps having forward and after ends and an outer and inner surface and spaced peripherally about and pivotally attached to said outer duct after end to form a variable area continuation thereof, means to pivot said flaps between an inner subsonic position wherein said inner surfaces of said flaps form a convergent continuation of said outer duct inner surface while converging more rapidly than said inner body convergent wall to define a first nozzle throat between said flap after end and said inner body converging wall which is tipped with respect to said axis and is substantially perpendicular to said inner body converging wall while said flap outer surface is substantially parallel to said flap inner surface and forms a smooth convergent continuation of said outer duct outer surface and an outer supersonic position wherein said inner surface of said flaps forms a divergent continuation of said outer duct inner surface while a second tipped nozzle throat is formed between said outer duct after end and said inner body convergent wall which second throat is substantially perpendicular to said inner body convergent wall and of larger area than and spaced axially forward of said first throat and wherein said outer surfaces of said flaps coact with said outer duct outer surface to define a smooth surface.

2. An exhaust nozzle of circular cross section and having an axis and adapted to be used on a jet propulsion type aircraft engine which will fly at both subsonic and supersonic speeds comprising a fixed inner body having a forward and an after end and further having a diverging wall at its forward end and a converging wall at its after end with a central wall smoothly joining said diverging and converging walls to define the region of maximum diameter of said inner body, an outer member having a forward and an after end and an inner surface and a substantially cylindrical outer surface and concentrically enveloping a part of said inner body and extending from the forward end thereof and terminating substantially short of the after end thereof at a point aft of said inner body maximum diameter region and being divergent at said forward end and convergent at said after end to a greater degree than said inner body converging wall to define an annular gas passage with said inner body which is convergent in cross section and which is divergent with respect to said axis at its forward end and which is convergent with respect to said axis at its after end, a plurality of inner and outer flaps each having forward and after ends and an outer and inner surface, and spaced circumferentially about and pivotally attached to said outer member after end with said inner flaps attached to said outer member inner surface and with said outer flaps attached to said outer member outer surface to form a continuation of each, means to pivot said flaps between an inner subsonic position wherein said inner surface of said inner flaps forms a convergent continuation of said outer member inner surface while converging more rapidly than said inner body convergent wall to define a first nozzle throat between said inner flap after end and said inner body converging wall which is tipped with respect to said axis and is substantially perpendicular to said inner body converging wall while said outer flap outer surface is substantially parallel to said inner flap inner surface and forms a smooth convergent continuation of said outer member outer surface and an outer supersonic position wherein said inner surface of said inner flaps forms a divergent continuation of said outer member inner surface while a second tipped nozzle throat is formed between said outer duct after end inner surface and said inner body convergent wall which second throat is substantially perpendicular to said inner body convergent wall and of larger area than and spaced axially forward of said first throat and wherein said outer surfaces of said outer flaps coact with said outer duct outer surface to define a substantially cylindrical surface.

3. An exhaust nozzle having an axis and adapted to be used on a jet propulsion type aircraft engine which will fly at both subsonic and supersonic speeds comprising a fixed inner body concentric about said axis and having a forward and an after end and further having a diverging wall at its forward end and a converging wall at its after end with a central wall smoothly joining said diverging and converging walls to define the region of maximum dimension of said inner body, an outer member having a forward and an after end and an inner wall and a smooth outer wall and concentrically enveloping a part of said inner body and extending from the forward end thereof and terminating substantially short of the after end thereof at a point aft of said inner body maximum dimension region with said inner wall being fixed and divergent at said forward end and being convergent at said after end to a greater degree than said inner body converging wall to define a gas passage with said inner body which is divergent with respect to said axis at its forward end and which is convergent with respect to said axis at its after end, means to position said outer member with respect to said inner body so that said gas passage is convergent, said outer member inner wall convergent portion being axially reciprocal, a plurality of inner and outer flaps having forward and after ends and outer and inner surfaces with said inner flaps spaced peripherally about and pivotally attached to said outer member inner wall after end to form a variable area continuation thereof with said outer flaps spaced peripherally about and pivotally attached to said outer member outer wall after end to form a variable area continuation thereof, means connecting said outer member inner wall convergent portion, said inner flaps and said outer flaps so that the movement of said outer member inner wall convergent portion aft will pivot said flap pluralities to an inner subsonic position wherein said inner surfaces of said inner flaps form a convergent continuation of said outer member divergent portion which converges more rapidly than said inner body convergent wall to define a first nozzle throat between said inner flap after end and said inner body converging wall which is tipped with respect to said axis and is substantially perpendicular to said inner body converging wall and wherein said outer flap outer surface is substantially parallel to said inner flap inner surface and forms a smooth convergent continuation of said outer member outer wall and, further, so that the movement of said outer member inner wall converging portion forward will pivot said flap pluralities to an outer supersonic position wherein said inner surface of said inner flaps forms a divergent continuation of said outer member inner wall convergent portion while a second tipped nozzle throat is formed between said outer member inner wall convergent portion after end and said inner body convergent wall which second throat is substantially perpendicular to said inner body convergent wall and of larger area than and spaced axially forward of said first throat and wherein said outer surfaces of said outer flaps coact with said outer member outer wall to define a smooth surface.

4. An aircraft jet engine capable of powering an aircraft at subsonic and supersonic flight speeds and having exhaust nozzle with an axis, said exhaust nozzle comprising a fixed inner body concentric about said axis and having a forward and an after end and further having a diverging wall at its forward end and a converging wall at its after end with a central wall smoothly joining said diverging and converging walls to define the region of maximum dimension of said inner body, an outer member having a forward and an after end and an inner wall and a smooth outer wall and concentrically enveloping a part of said inner body and extending from the forward end thereof and terminating substantially short of the after end thereof at a point aft of said inner body maximum dimension region with said inner wall being fixed and divergent at said forward end and being convergent at said after end to a greater degree than said inner body converging wall to define a gas passage with said inner body which is divergent with respect to said axis at its forward end and which is convergent with respect to said axis at its after end, means to position said outer member with respect to said inner body so that said gas passage is convergent, said outer member inner wall convergent portion being axially reciprocal, a plurality of inner and outer flaps having forward and after ends and outer and inner surfaces with said inner flaps spaced peripherally about and pivotally attached to said outer member inner wall after end to form a variable area continuation thereof with said outer flaps spaced peripherally about and pivotally attached to said outer member outer wall after end to form a variable area continuation thereof, means connecting said outer member inner wall convergent portion, said inner flaps and said outer flaps so that the movement of said outer member inner wall convergent portion aft will pivot said flap pluralities to an inner subsonic position wherein said inner surfaces of said inner flaps form a convergent continuation of said outer member divergent portion which converges more rapidly than said inner body convergent wall to define a first nozzle throat between said inner flap after end and said inner body converging wall which is tipped with respect to said axis and is substantially perpendicular to said inner body converging wall and wherein said outer flap outer surface is substantially parallel to said inner flap inner surface and forms a smooth convergent continuation of said outer member outer wall and, further, so that the movement of said outer member inner wall converging portion forward will pivot said flap pluralities to an outer supersonic position wherein said inner surface of said inner flaps forms a divergent continuation of said outer member inner wall convergent portion while a second tipped nozzle throat is formed between said outer member inner wall convergent portion after end and said inner body convergent wall which second throat is substantially perpendicular to said inner body convergent wall and of larger area than and spaced axially forward of said first throat and wherein said outer surfaces of said outer flaps coact with said outer member outer wall to define a smooth surface, aircraft nacelle enveloping said engine and terminating forward of said outer member outer wall to expose said outer member outer wall to atmosphere and said engine being operable in flight to pass heated and pressurized gas through said gas passage and atmosphere air over said nacelle and the outer surface of said outer member outer wall and said outer flap outer surfaces at velocities so that with said nozzle in said subsonic position, said gas will be discharged to atmosphere and expand against said inner body convergent wall while said air flows in a direction to cause said gas to follow said inner body convergent wall and so that with said nozzle in said supersonic position, said gas will expand along said inner body convergent wall and said inner flap inner surfaces and so that said air will flow smoothly along the outer surface of said outer member outer wall and said outer flap outer surfaces.

5. An exhaust nozzle of generally circular cross section and concentric about an axis comprising an inner body, an outer duct concentrically surrounding said inner body to form a gas passage of annular cross section therebetween, said inner body and said outer duct having convergent after ends, means to support said inner body and said outer duct so that said outer duct after end is positioned a substantial distance axially forward of said inner body after end while said outer duct converges toward said inner body so that said gas passage is convergent in area and to said axis, a plurality of flaps having forward and after ends and pivotally connected to said outer duct after end and pivotable between an inner position and an outer position, said flaps being of such axial length that said flap after ends are positioned a substantial distance axially forward of said inner body convergent after end so that a substantial portion of said inner body convergent after end extends rearwardly beyond said flaps, said flaps having inner and outer surfaces so shaped that when said flaps are in said inner position said flap inner surface forms a convergent continuation of said outer duct to define a continuation of said convergent gas passage terminating in a first nozzle minimum area throat which is substantially perpendicular to the surface of said inner body convergent after end and extends between said flap after ends and said inner body convergent after end while said flap outer surfaces extend substantially parallel to said flap inner surface while defining a smooth, gradually convergent surface and further so that when said flaps are in said outer position said flap inner surfaces form a divergent continuation of said outer duct after end to cooperate with said inner body and outer duct to define a convergent-divergent exhaust nozzle having a second throat which is substantially perpendicular to the surface of said inner body convergent after end and extends between said outer duct after end and said inner body convergent after end and which second throat is larger in area than and is spaced axially forward of said first throat while said flap outer surface is substantially cylindrical.

6. An exhaust nozzle of generally circular cross section and concentric about an axis comprising an inner body, an outer duct concentrically surrounding said inner body to form a gas passage of annular cross section therebetween, said inner body and said outer duct having convergent after ends, means to support said inner body and said outer duct so that said outer duct after end is positioned a substantial distance axially forward of said inner body after end while said outer duct converges toward said inner body so that said gas passage is convergent in area and to said axis, a plurality of flaps having forward and after ends and pivotally connected to said outer duct after end and pivotable between an inner position and an outer position, said flaps being of such axial length that said flap after ends are positioned a substantial distance axially forward of said inner body convergent after end so that a substantial portion of said inner body convergent after end extends rearwardly beyond said flaps, said flaps having inner and outer surfaces so shaped that, when said flaps are in said inner position, said flap inner surface forms a convergent continuation of said outer duct to define a continuation of said convergent gas passage terminating in a first nozzle throat which extends between said flap after ends and said inner body convergent after end while said flap outer surfaces extend substantially parallel to said flap inner surface while defining a smooth, gradually convergent surface and so that, when said flaps are in said outer position, said flap inner surfaces form a divergent continuation of said outer duct after end to cooperate with said inner body and outer duct to define a convergent-divergent exhaust nozzle having a second throat which extends between said outer duct after end and said inner body convergent after end and which second throat is larger in area than said first throat while said flap outer surface is substantially cylindrical.

7. An exhaust nozzle of generally circular cross section and concentric about an axis comprising an inner body, an outer member having an outer substantially cylindrical surface and an inner surface which concentrically surrounds said inner body to form a gas passage of annular cross section therebetween, said inner body and said outer member inner surface having convergent after ends, means to support said inner body and said outer member so that said outer member after end is positioned a substantial distance axially forward of said inner body after end while said outer member inner surface converges toward said inner body so that said gas passage is convergent in area and to said axis, a plurality of inner and outer flaps having forward and after ends with said inner flaps pivotally connected to said outer member inner surface after end while said outer flaps are pivotally connected to said outer member outer surface with each flap plurality pivotable between an inner position and an outer position, said flaps being of such axial length that said flap after ends are positioned a substantial distance axially forward of said inner body convergent after end so that a substantial portion of said inner body convergent after end extends rearwardly beyond said flaps, said flaps having inner and outer surfaces so shaped that, when said flaps are in said inner position, said inner flap inner surface forms a convergent continuation of said outer member inner surface to define a continuation of said convergent gas passage terminating in a first nozzle throat which is substantially perpendicular to the surface of said inner body convergent after end and extends between said inner flap after ends and said inner body convergent after end while said outer flap outer surface extends substantially parallel to said inner flap inner surface while defining a smooth continuation of said outer member outer surface as a gradually convergent surface and so that, when said flaps are in said outer position, said inner flap inner surfaces form a divergent continuation of said outer member inner surface after end to cooperate with said inner body and outer member inner surface to define a convergent-divergent exhaust nozzle having a second throat which is substantially perpendicular to the surface of said inner body convergent after end and extends between said outer member after end and said inner body convergent after end and which second throat is equal to or larger in area than and is spaced axially forward of said first throat while said outer flap outer surface forms a substantially cylindrical continuation of said outer member outer surface.

References Cited in the file of this patent
UNITED STATES PATENTS

| | | |
|---|---|---|
| 2,683,962 | Griffith | July 20, 1954 |
| 2,831,321 | Laucher | Apr. 22, 1958 |
| 2,841,956 | Gunson | July 8, 1958 |
| 2,923,127 | Biehl et al. | Feb. 2, 1960 |
| 2,938,335 | Cook | May 31, 1960 |

FOREIGN PATENTS

| | | |
|---|---|---|
| 1,036,582 | Germany | Aug. 14, 1958 |
| 750,307 | Great Britain | June 13, 1956 |
| 795,652 | Great Britain | May 28, 1958 |